United States Patent [19]

Barro

[11] Patent Number: 4,477,004
[45] Date of Patent: Oct. 16, 1984

[54] PARCEL RACK FOR USE ON A VEHICLE SUCH AS A BICYCLE

[75] Inventor: Giovanni Barro, Conegliano, Italy

[73] Assignee: Fratelli Barro, Giovanni E Luigi, S.r.L., Conegliano, Italy

[21] Appl. No.: 440,746

[22] Filed: Nov. 10, 1982

[30] Foreign Application Priority Data

Nov. 19, 1981 [IT] Italy .............................. 34051/81[U]

[51] Int. Cl.³ .............................................. B62J 7/04
[52] U.S. Cl. .................................... 224/39; 224/30 R;
248/286; 248/296; 403/59; 403/396
[58] Field of Search ...................... 224/37, 38, 39, 40;
248/242, 291, 295.1, 296, 297.2, 286; 403/396, 59, 61

[56] References Cited

U.S. PATENT DOCUMENTS

| 2,776,790 | 1/1957 | Zbikowski | 224/39 R |
| 3,677,584 | 7/1972 | Short | 403/396 X |
| 3,779,435 | 12/1973 | Niemann | 224/37 |
| 4,117,962 | 10/1978 | Pletscher | 224/37 X |

FOREIGN PATENT DOCUMENTS

| 316315 | 11/1956 | Canada | 224/39 R |
| 18513 | 11/1980 | European Pat. Off. | 224/38 |
| 444559 | 3/1926 | Fed. Rep. of Germany | 224/39 R |
| 2524240 | 9/1976 | Fed. Rep. of Germany | 244/39 |
| 3031065 | 3/1981 | Fed. Rep. of Germany | 224/38 |
| 479184 | 3/1953 | Italy | 403/396 |
| 478996 | 3/1953 | Italy | 403/396 |
| 316315 | 11/1956 | Switzerland | 224/39 R |

Primary Examiner—Allan N. Shoap
Attorney, Agent, or Firm—Wenderoth, Lind & Ponack

[57] ABSTRACT

A parcel rack for use on a vehicle such as a bicycle includes a frame structure defining a planar area for supporting parcels and the like. The frame structure has at a first end thereof attaching structure to attach the frame structure to the frame of a vehicle. A bracing structure is provided to brace the frame structure with respect to the vehicle frame. Attachment units removably connect the bracing structure to an end of the frame structure spaced from the first end thereof. The attachment units enable the bracing structure to be removed from the frame structure and to be fixed thereto at a varying positions with respect thereto and to extend in varying directions therefrom.

3 Claims, 3 Drawing Figures

U.S. Patent
Oct. 16, 1984
4,477,004
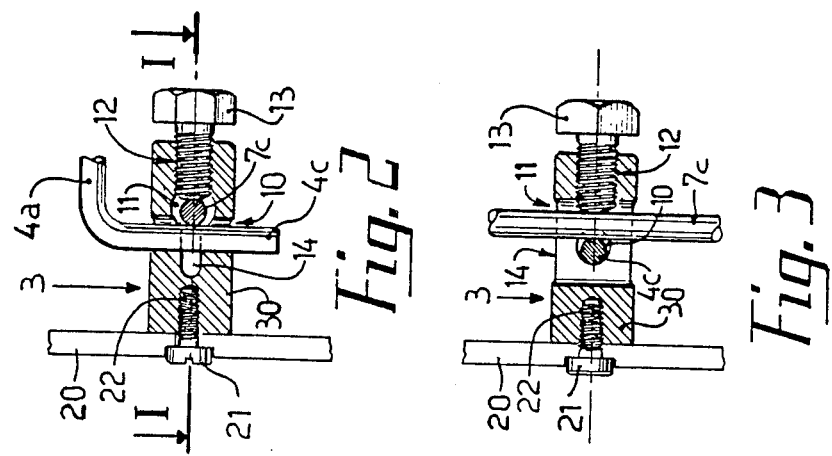
Fig.2
Fig.3
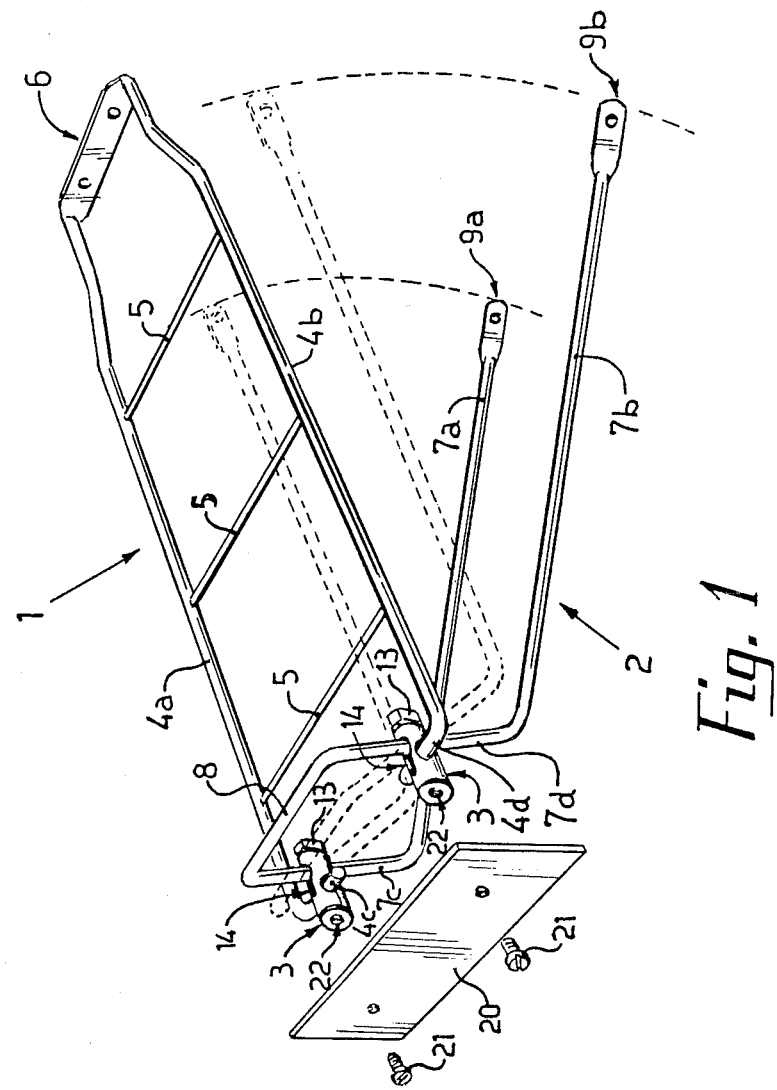
Fig.1

PARCEL RACK FOR USE ON A VEHICLE SUCH AS A BICYCLE

BACKGROUND OF THE INVENTION

The present invention relates to a parcel rack, particularly a parcel rack for installation on vehicles such as bicycles. More specifically, the present invention relates to such a parcel rack which is capable of being folded and adjusted in varying different ways to obtain practical dimensional variations which enable the parcel rack to be used on vehicles of different sizes and and which facilitate easy storage of the parcel rack.

Various devices are known which can be mounted on bicycles, motorcycles and the like, and on which articles to be transported can be placed and fastened in various fashions. Such devices, commonly known as parcel racks, usually include a small metal frame generally rectangular in shape and forming a planar area on which parcels or packages are placed. This frame is attached at one end thereof to the bicycle structure and has on the sides thereof two bars serving as struts which are appropriately inclined in relation to the planar area and which are attachable on their free ends to the bicycle structure.

These lateral bars are integrally formed with the body of the small metal frame and are non-detachably affixed thereto. This structural configuration results in several disadvantages. First, as is known, bicycles or similar vehicles vary greatly in size and shape so that several types and sizes of parcel racks with appropriate dimensions are necessary. Additionally, since the two lateral bracing bars are permanently attached to the small rack frame, the resulting parcel rack inherently occupies a relatively great amount of space. Consequently, retailers of such accessories are forced to maintain in stock several types and sizes of parcel racks which, as mentioned above, occupy a considerable amount of space because of their shape.

SUMMARY OF THE INVENTION

With the above discussion in mind, it is an object of the present invention to provide an improved parcel rack for use on a vehicle such as a bicycle, whereby the above and other prior art disadvantages are overcome.

It is a further object of the present invention to provide such a parcel rack which is adjustable so that it may be used on vehicles of different sizes and shapes.

It is an even further object of the present invention to provide such a parcel rack which may be adjusted to occupy a relatively small amount of space during storage.

The above objects are achieved in accordance with the present invention by the provision of a parcel rack for use on a vehicle such as a bicycle, such parcel rack including a frame structure defining a planar area for supporting parcels and the like, the frame structure having at a first end thereof means for attaching the frame structure to a frame of the bicycle, a bracing structure for bracing the frame structure with respect to the bicycle frame, and attachment means for removably connecting the bracing structure to an end of the frame structure spaced from the first end thereof, such that the bracing structure may be removed from connection to the frame structure and may be fixed to the frame structure at varying positions with respect thereto and to extend in varying directions therefrom.

The frame structure includes a substantially U-shaped member defined by a pair of laterally spaced arms joined at first ends thereof by the attaching means, the arms being connected by transverse elements. Second ends of the arms have extending laterally inwardly therefrom respective shaft sections. The bracing structure includes a substantially U-shaped element including a pair of bar members connected at first ends thereof by a transverse section, second ends of the bar members including means for connection to the bicycle frame. The bar members, at positions adjacent the transverse section, are bent, thus providing sections which form, when the bracing structure is mounted on the frame structure, a concave angle whose convexity is directed toward the inside of the resulting rack structure.

The attachment means includes a pair of units, each having therethrough first and second orthogonal holes which partially intersect each other. The shaft sections of the arms of the frame structure extend through the first holes of the respective units, and the bar members of the bracing structure extend through the second holes of respective of the units. Accordingly, the bracing structure and the units are rotatable with respect to the frame structure about the shaft sections, thereby making it possible to vary the angular relationship between the frame and the bracing structures. Also, the bar members of the bracing structure are axially movable within the second holes, thereby making it possible to vary the positional relationship between the frame and bracing structures. Clamping means, for example lock bolts are provided on each unit for fixing the respective shaft sections and bar members at particular angular and positional relationships of the bracing and frame structures. Each lock bolt is threaded into a respective unit and extends perpendicular to the first and second holes therein, such that the lock bolt extends into one of the holes and contacts and clamps the respective bar member and shaft section in a fixed position in the respective unit.

BRIEF DESCRIPTION OF THE DRAWINGS

Other objects, features and advantages of the present invention will be more apparent from the following detailed description of a preferred embodiment of the present invention, with reference to the accompanying drawings, wherein:

FIG. 1 is a perspective view of a parcel rack in accordance with the present invention;

FIG. 2 is a horizontal section through a portion of the structure of FIG. 1; and FIG. 3 is a transverse section taken along the line I—I of FIG. 2.

DETAILED DESCRIPTION OF THE INVENTION

With reference to the drawings, illustrated therein is a parcel rack according to the present invention and essentially composed of two parts, namely a frame structure 1 which is to support parcels or packages, and a bracing structure 2. The frame structure 1 and the bracing structure 2 are removably and adjustably connected by fastening or attachment means 3.

Frame structure 1 basically includes an outer member in the form of a metal rod bent into a substantially U-shape, including laterally spaced arms 4a, 4b forming longitudinal outer components of the frame structure. Section 6 of the U-shaped connects forward ends of arms 4a, 4b and is configured, in a generally known manner, to form means for attaching the frame structure to a frame of a vehicle such as a bicycle. Transverse elements 5 extend between and connect arms 4a, 4b. Thus, the frame structure 1 defines a generally planar area for support of parcels or packages. The rear ends of lateral arms 4a, 4b are bent inwardly, thereby forming relatively short shaft sections 4c and 4d, respectively.

Bracing structure 2 may be formed of a metal rod, also generally U-shaped, the lateral arms of which form straight bracing bar members 7a, 7b joined at first ends thereof by a transverse section 8. Free ends 9a, 9b of the bar members include means for connection to the vehicle frame in a known manner, for example by being suitably flattened and provided with through holes. Furthermore, the bar members 7a, 7b are, at positions adjacent transverse section 8, bent to form two sections 7c and 7d, respectively, which, when the bracing structure 2 is mounted on the frame structure 1, form a concave angle whose convex side faces the inside of the resulting rack unit.

The attachment means includes a pair of fixing units 3. Each unit 3 may be in the form of a cylindrical body 30 having therethrough first and second orthogonal holes 10, 11 which partically intersect each other, as more clearly shown in FIGS. 2 and 3. The shaft sections 4c, 4d of the arms of the frame structure 1 extend through first holes 10 of the respective units 3. The bar members of the bracing structure 2 extend through respective of the second holes 11 of the respective units 3. Each body 30 has therein a longitudinal, coaxial threaded hole 12 extending from one of its ends and into one of the above mentioned orthogonal holes, in the illustrated example the hole 11. Clamping means, for example a lock bolt 13, is threaded into hole 12 and extends into hole 11. Thus, by tightening bolt 13, the bolt 13 clamps against the bar member, thereby clamping the bar member against the body 30, and also clamping the shaft section against the body 30. This relationship clearly is illustrated in the drawings. It is to be noted that the diameters of holes 10 and 11 are somewhat larger than the diameters of the respective shaft section and bar member, thereby enabling free sliding movement of the shaft sections and bar members when the bolts 13 are loosened. Moreover, in order to enable the flattened free ends 9a, 9b of the bracing structure 2 to pass through the attachment units, bodies 30 may be provided with suitable grooves 14 opening into respective holes 11.

As a result of the above structural arrangements, by loosening bolts 13, it is possible not only to completely detach the frame structure 1 from the bracing structure 2, but also it is possible to adjust the angular and positional relationships between bracing structure 2 and frame structure 1. Accordingly, it will be apparent that it is possible to mount the parcel rack of the present invention on bicycles or similar vehicles of varying different sizes and shapes.

More specifically, upon loosening bolts 13, it would be apparent that sections 7c, 7d and bar members 7a, 7b may be moved axially through respective holes 11, without movement of the frame structure 1 and the units 3, thereby providing a limitless number of varying positional relationships between the bracing structure and the frame structure. Furthermore, the dotted lines in FIG. 1 indicate how it is possible to pivot the bracing structure 2 and the units 3 about the axis of shaft sections 4c, 4d, thereby to make it possible to achieve a limitless number of varying relative angular relationships between the bracing structure and the frame structure. Even further, the phantom lines in FIG. 1 illustrate how it is possible to pivot the bracing structure 2 with respect to the frame structure 1 to provide a very compact unit which is of obvious advantage during storage of the parcel rack.

After positioning the parcel rack of the present invention on a vehicle, for example a particular bicycle, it will be sufficient to tighten bolts 13 which, in combination with attachment units 3, will join the frame structure 1 and bracing structure 2 and secure them in the desired mounted position.

Additionally, as will be apparent from the drawings, the parcel rack of the present invention easily is adaptable for the mounting of a rear reflector on the parcel rack. Thus, a reflector 20 can be secured directly to the attaching units 3 using appropriate screws 21 which may be threaded into respective threaded holes 22 formed in bodies 30, at ends thereof opposite to the ends containing threaded holes 12. Such application is illustrated in a partially exploded manner in FIG. 1, and is shown in FIGS. 2 and 3 in a mounted condition.

It will be apparent from the above discussion, that the parcel rack according to the present invention has certain substantially improved advantages over the prior art. Thus, a single parcel rack can be mounted easily and without difficulty on different types of bicycles and similar vehicles of substantially varying sizes and shapes. Furthermore, the parcel rack of the present invention, when not in use, can be folded, thereby reducing the amount of space required for storage.

Although the present invention has been described and illustrated with regard to a preferred embodiment thereof, it is to be understood that various modifications as will be apparent to those skilled in the art may be made without departing from the scope of the present invention.

I claim:

1. A parcel rack for use on a vehicle such as a bicycle, said rack comprising:

a frame structure defining a planar area for supporting parcels and the like, said frame structure comprising a substantially U-shaped member defined by a pair of laterally spaced arms having first ends joined by means for attaching said frame structure to a frame of a vehicle such as a bicycle and second ends spaced from said first ends;

a bracing structure for bracing said frame structure with respect to the vehicle frame, said bracing structure comprising a substantially U-shaped element including a pair of bar members having first ends connected by a transverse section and second ends for connection to the vehicle frame, said bar members, at positions adjacent said transverse section, being bent to form respective straight portions which are coplanar; and attachment means for removably connecting said bracing structure to said second ends of said arms in a manner such that said bracing structure may be removed from connection to said frame structure, such that said bracing structure may be fixed to said frame structure at varying positions spaced generally along said bar members of said bracing structure, and such that said bracing structure may be rotated with respect to said frame structure to extend in varying directions therefrom, said attachment means comprising a pair of units, each said unit having therethrough first and second orthogonal holes which partially intersect each other and a third hole perpendicular to and intersecting said second hole, said second ends of said arms of said frame structure having laterally inwardly extending shaft sections extending through said first holes of respective said units, said straight portions of said bar members of said bracing structure extending through said second holes of respective said units, such that said bar members and said units are rotatable with respect to said frame structure about said shaft sections, thereby to vary the angular relationship between said frame structure and said bar members, and such that said bar members of said bracing structure are axially movable within said second holes, thereby to vary the relative positional relationship between said frame structure and said bar members, and clamping means on each said unit for fixing the respective said shaft sections and bar members at particular angular and positional relationships of said frame structure and said bar members.

2. A parcel rack as claimed in claim 1, wherein said second ends of said bar members include flattened portions for connection to the vehicle frame.

3. A parcel rack as claimed in claim 1, wherein each said clamping means comprises a lock bolt threaded into said third hole in the respective said unit, said bolt extending from said third hole into said second hole and clamping the respective said bar member and said shaft section in a fixed position in said unit.

* * * * *